United States Patent
Dell'Era et al.

(10) Patent No.: US 10,594,720 B2
(45) Date of Patent: Mar. 17, 2020

(54) EXERCISING SECURITY CONTROL POINT (SCP) CAPABILITIES ON LIVE SYSTEMS BASED ON INTERNAL VALIDATION PROCESSING

(71) Applicant: International Business Machines Corporation, Armonk, NY (US)

(72) Inventors: Ivan Dell'Era, Shirley, MA (US); Kevin R. O'Connor, Danbury, CT (US); William J. Rippon, Putnam Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 172 days.

(21) Appl. No.: 15/802,497

(22) Filed: Nov. 3, 2017

(65) Prior Publication Data

US 2020/0028870 A1    Jan. 23, 2020

(51) Int. Cl.
*H04L 29/06* (2006.01)
*G06F 21/56* (2013.01)
*H04L 12/26* (2006.01)

(52) U.S. Cl.
CPC .......... *H04L 63/1433* (2013.01); *G06F 21/56* (2013.01); *G06F 21/566* (2013.01); *H04L 43/10* (2013.01); *H04L 63/20* (2013.01)

(58) Field of Classification Search
CPC ......... G06F 21/566; G06F 2009/45587; G06F 21/50; G06F 21/53; G06F 21/556; G06F 21/56; G06F 21/572; G06F 21/60; G06F 21/629; G06F 2221/033; G06F 2221/034; G06F 2221/2125; H04L 41/145; H04L 43/10; H04L 43/50; H04L 47/2408
See application file for complete search history.

(56) References Cited

U.S. PATENT DOCUMENTS

| | | | |
|---|---|---|---|
| 5,491,749 A | 2/1996 | Rogaway | |
| 6,092,194 A * | 7/2000 | Touboul | G06F 21/51 726/24 |
| 2003/0005326 A1 | 1/2003 | Flemming | |
| 2006/0235831 A1* | 10/2006 | Adinolfi | G06Q 40/00 |
| 2006/0247944 A1* | 11/2006 | Calusinski, Jr. | G06Q 40/00 705/1.1 |

(Continued)

*Primary Examiner* — Ninos Donabed
(74) *Attorney, Agent, or Firm* — Jeffrey S. LaBaw; David H. Judson

(57) ABSTRACT

A security control point (SCP) that protects target computing system is tested in-place and while active. The approach is initiated the SCP receiving and processing one or more "simulated" communication flows. To this end, a test initiator system is configured to generate and transmit communication flows to the SCP being tested. The SCP extracts the encapsulated flow, and then processes that flow through one or more of the SCP's configured protection mechanisms. Thus, the SCP processes the simulated communication flow as though it were a real session, and thus to determine what actions, if any, should be taken with respect to that flow. After processing, the simulated session traffic is shunted or otherwise diverted away from the target computing system. The results of the SCP's processing, however, are output to other systems (e.g., logging or alerting mechanisms), or they are returned to the test initiation system, e.g., for correlation, reporting, and the like.

15 Claims, 5 Drawing Sheets

(56) References Cited

U.S. PATENT DOCUMENTS

| | | | |
|---|---|---|---|
| 2007/0136783 A1 | 6/2007 | Shelest et al. | |
| 2007/0162890 A1* | 7/2007 | Meier | G06F 21/577 717/100 |
| 2007/0253371 A1* | 11/2007 | Harper | H04W 8/082 370/331 |
| 2008/0022357 A1* | 1/2008 | Agarwal | H04L 63/20 726/1 |
| 2008/0301766 A1* | 12/2008 | Makino | G06F 21/51 726/1 |
| 2009/0097418 A1* | 4/2009 | Castillo | H04L 41/12 370/255 |
| 2011/0126168 A1* | 5/2011 | Ilyayev | G06F 9/5072 717/103 |
| 2012/0110462 A1* | 5/2012 | Eswaran | G06F 9/5072 715/736 |
| 2012/0158667 A1* | 6/2012 | Raju | G06F 16/84 707/687 |
| 2012/0266209 A1* | 10/2012 | Gooding | H04L 63/20 726/1 |
| 2014/0119203 A1* | 5/2014 | Sundaram | H04L 43/10 370/250 |
| 2015/0012998 A1* | 1/2015 | Nellikar | H04L 63/0245 726/13 |
| 2015/0138993 A1* | 5/2015 | Forster | H04L 41/12 370/248 |
| 2016/0164734 A1* | 6/2016 | Durgin | H04L 41/0836 370/389 |
| 2016/0352763 A1* | 12/2016 | Zou | H04L 63/1425 |
| 2017/0169230 A1 | 6/2017 | Zheng et al. | |

\* cited by examiner

EXERCISING SECURITY CONTROL POINT (SCP) CAPABILITIES ON LIVE SYSTEMS BASED ON INTERNAL VALIDATION PROCESSING

BACKGROUND OF THE INVENTION

Technical Field

This disclosure relates generally to communication network security.

Background of the Related Art

Today's systematic approaches for understanding and validating specific in-place protections within active security control points (e.g., a firewall, an Intrusion Protection System (IPS), etc.) used to protect specific target systems are quite limited. Typically, these approaches involve reviews of security point configurations, or generic live testing that is not sufficiently granular in nature. Target systems may also deploy endpoint agents that coordinate with network level approaches for greater visibility of protection mechanisms. Generic testing methods also have several key drawbacks, even when combining endpoint intelligence. First, they create a burden on the target system, which may affect its ability to provide its intended services. Second, these techniques cannot test in a granular manner all source/destination variations and their associated communication flows. This lack of visibility and intelligence regarding security control point protections for specific target systems prevents optimal service and, more importantly, potentially exposes these systems to avoidable threats.

BRIEF SUMMARY

According to this disclosure, a security control point (SCP) that is protecting a target computing system is tested in-place and while active. The approach is initiated by generating and processing by the SCP of simulated communication flows. To this end, an appropriately authorized (i.e., identified and authenticated) test initiation (or "initiator") system is configured to generate and transmit communication flows to the SCP being tested. Preferably, the communication flows are encapsulated and thus are secure. The SCP includes a service (which may be an add-on, or native) that extracts the encapsulated flow, and then processes that flow through one or more of the SCP's configured protection mechanisms. Thus, the SCP processes the simulated communication flow as though it were a real session, and thus to determine what actions, if any, should be taken with respect to that flow. According to this approach, however, the SCP does not deliver the simulated session traffic to the target computing system. Rather, preferably the results of the simulated processing by the SCP are output to other systems (e.g., logging or alerting mechanisms), or they are returned to the test initiation system, e.g., for correlation, reporting, and the like. Using this approach, Information Technology (IT) security management organizations remotely, automatically and programmatically determine the behavior and therefore protection levels of a SCP and with respect to any potential, specific, source and destination systems.

As an extension of the above-described approach, and in addition to the test initiator system (operating as a front-end to the SCP), a back-end testing simulation server is configured behind the SCP, preferably in a same logical compartment as the actual target system. In addition to performing general protection processing per the enabled configurations as described above, the SCP also passes the communication flow on to the back-end simulator system (once again, instead of to the actual target system). In this manner, the front-end and back-end testing systems can then interact with one another via one or more conversations (flows) that are conducted between them, all while having the SCP process those flows through its enabled protection mechanisms as if it were for the actual source and destination systems. In effect, the front-end and back-end testing systems act as surrogates for the actual source and destination systems.

The foregoing has outlined some of the more pertinent features of the disclosed subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which.

DETAILED DESCRIPTION OF AN ILLUSTRATIVE EMBODIMENT

Figure 1:
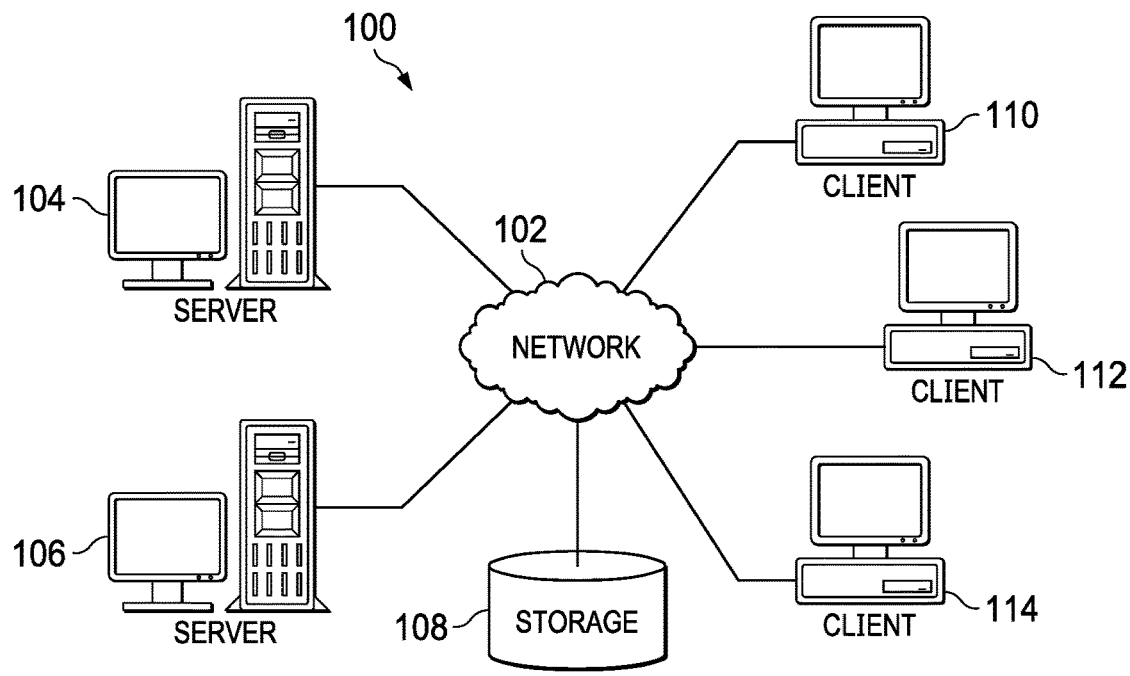
FIG. 1 depicts an exemplary block diagram of a distributed data processing environment in which exemplary aspects of the illustrative embodiments may be implemented.
Figure 2:
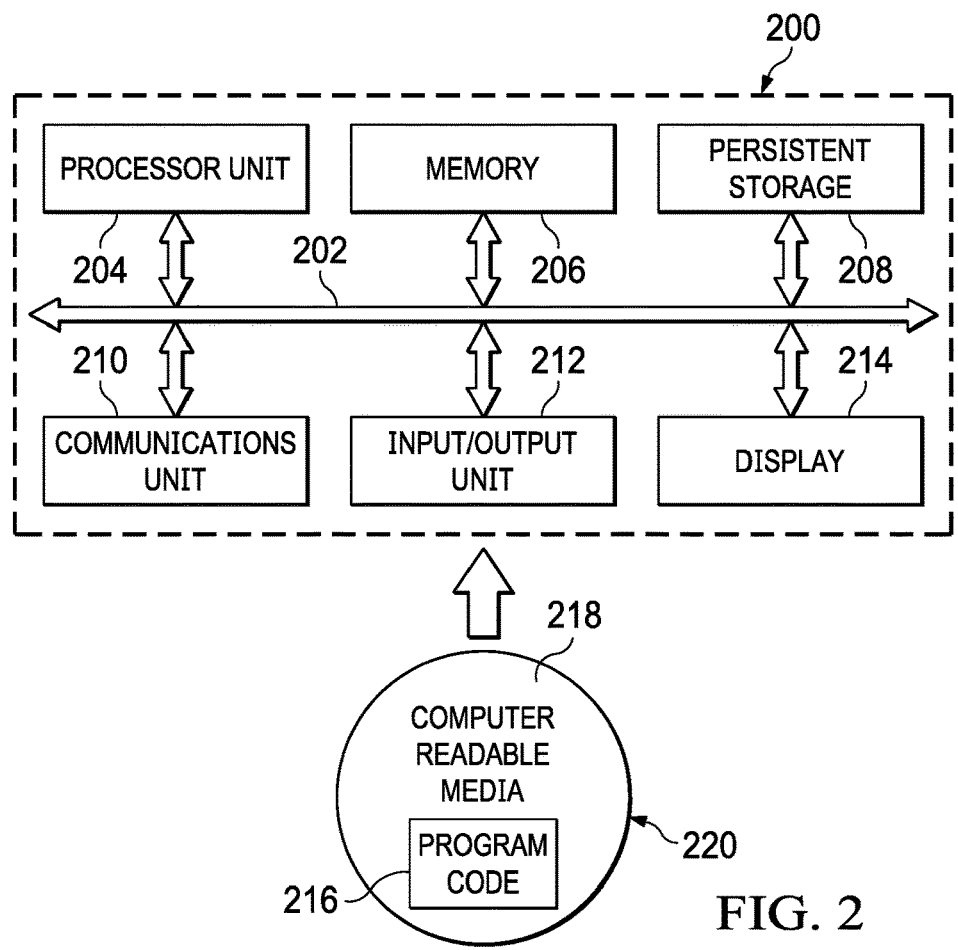
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the disclosed subject matter.

Client-Server Technologies

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++, C #, Objective-C, or the like, and conventional procedural programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Security Intelligence Platform with Incident Forensics

Figure 3:
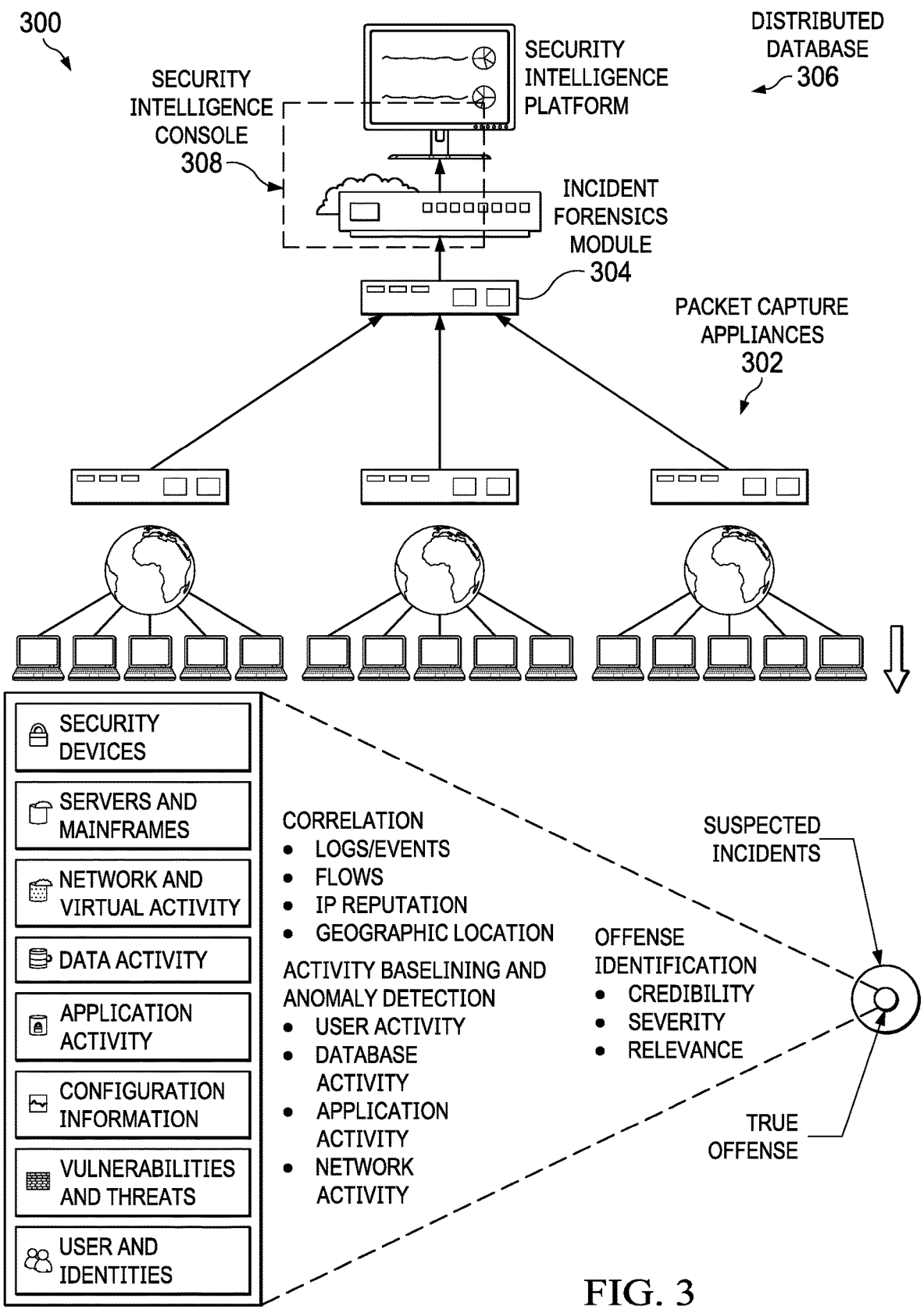
FIG. 3 illustrates a security intelligence platform in which the techniques of this disclosure may be practiced or associated.

A known type of security intelligence platform is illustrated in FIG. 3. Generally, the platform provides search-driven data exploration, session reconstruction, and forensics intelligence to assist security incident investigations. In pertinent part, the platform 300 comprises a set of packet capture appliances 302, an incident forensics module appliance 304, a distributed database 306, and a security intelligence console 308. The packet capture and module appliances are configured as network appliances, or they may be configured as virtual appliances. The packet capture appliances 302 are operative to capture packets off the network (using known packet capture (pcap) application programming interfaces (APIs) or other known techniques), and to provide such data (e.g., real-time log event and network flow) to the distributed database 306, where the data is stored and available for analysis by the forensics module 304 and the security intelligence console 308. A packet capture appliance operates in a session-oriented manner, capturing all packets in a flow, and indexing metadata and payloads to enable fast search-driven data exploration. The database 306 provides a forensics repository, which distributed and heterogeneous data sets comprising the information collected by the packet capture appliances. The console 308 provides a web- or cloud-accessible user interface (UI) that exposes a "Forensics" dashboard tab to facilitate an incident investigation workflow by an investigator. Using the dashboard, an investigator selects a security incident. The incident forensics module 304 retrieves all the packets (including metadata, payloads, etc.) for a selected security incident and reconstructs the session for analysis.

A representative commercial product that implements an incident investigation workflow of this type is IBM® Security QRadar® Incident Forensics V7.2.3 (or higher). Using this platform, an investigator searches across the distributed and heterogeneous data sets stored in the database, and receives a unified search results list. The search results may be merged in a grid, and they can be visualized in a "digital impression" tool so that the user can explore relationships between identities.

In particular, a typical incident forensics investigation to extract relevant data from network traffic and documents in the forensic repository is now described. According to this approach, the platform enables a simple, high-level approach of searching and bookmarking many records at first, and then enables the investigator to focus on the bookmarked records to identify a final set of records. In a typical workflow, an investigator determines which material is relevant. He or she then uses that material to prove a hypothesis or "case" to develop new leads that can be followed up by using other methods in an existing case. Typically, the investigator focuses his or her investigation through course-grained actions at first, and then proceeds to fine-tune those findings into a relevant final result set. The bottom portion of FIG. 3 illustrates this basic workflow. Visualization and analysis tools in the platform may then be used to manually and automatically assess the results for relevance. The relevant records can be printed, exported, or submitted processing.

As noted above, the platform console provides a user interface to facilitate this workflow. Thus, for example, the platform provides a search results page as a default page on an interface display tab. Investigators use the search results to search for and access documents. The investigator can use other tools to further the investigation. One of these tools is a digital impression tool. A digital impression is a compiled set of associations and relationships that identify an identity trail. Digital impressions reconstruct network relationships to help reveal the identity of an attacking entity, how it communicates, and what it communicates with. Known entities or persons that are found in the network traffic and documents are automatically tagged. The forensics incident module 304 is operative to correlate tagged identifiers that interacted with each other to produce a digital impression. The collection relationships in a digital impression report represent a continuously-collected electronic presence that is associated with an attacker, or a network-related entity, or any digital impression metadata term. Using the tool, investigators can click any tagged digital impression identifier that is associated with a document. The resulting digital impression report is then listed in tabular format and is organized by identifier type.

Generalizing, a digital impression reconstructs network relationships to help the investigator identify an attacking entity and other entities that it communicates with. A security intelligence platform includes a forensics incident module that is operative to correlate tagged identifiers that interacted with each other to produce a digital impression. The collection relationships in a digital impression report represent a continuously-collected electronic presence that is associated with an attacker, or a network-related entity, or any digital impression metadata term. Using the tool, investigators can click any tagged digital impression identifier that is associated with a document. The resulting digital impression report is then listed in tabular format and is organized by identifier type.

Typically, an appliance for use in the above-described system is implemented is implemented as a network-connected, non-display device. For example, appliances built purposely for performing traditional middleware service oriented architecture (SOA) functions are prevalent across certain computer environments. SOA middleware appliances may simplify, help secure or accelerate XML and Web services deployments while extending an existing SOA infrastructure across an enterprise. The utilization of middleware-purposed hardware and a lightweight middleware stack can address the performance burden experienced by conventional software solutions. In addition, the appliance form-factor provides a secure, consumable packaging for implementing middleware SOA functions. One particular advantage that these types of devices provide is to offload processing from back-end systems. A network appliance of this type typically is a rack-mounted device. The device includes physical security that enables the appliance to serve as a secure vault for sensitive information. Typically, the appliance is manufactured, pre-loaded with software, and then deployed within or in association with an enterprise or other network operating environment; alternatively, the box may be positioned locally and then provisioned with standard or customized middleware virtual images that can be securely deployed and managed, e.g., within a private or an on premise cloud computing environment. The appliance may include hardware and firmware cryptographic support, possibly to encrypt data on hard disk. No users, including administrative users, can access any data on physical disk. In particular, preferably the operating system (e.g., Linux) locks down the root account and does not provide a command shell, and the user does not have file system access. Typically, the appliance does not include a display device, a CD or other optical drive, or any USB, Firewire or other ports to enable devices to be connected thereto. It is designed to be a sealed and secure environment with limited accessibility and then only be authenticated and authorized individuals.

An appliance of this type can facilitate Security Information Event Management (SIEM). For example, IBM® Security QRadar® SIEM is an enterprise solution that includes packet data capture appliances that may be configured as appliances of this type. Such a device is operative, for example, to capture real-time Layer 4 network flow data from which Layer 7 application payloads may then be analyzed, e.g., using deep packet inspection and other technologies. It provides situational awareness and compliance support using a combination of flow-based network knowledge, security event correlation, and asset-based vulnerability assessment. In a basic QRadar STEM installation, the system such as shown in FIG. 3 is configured to collect event and flow data, and generate reports. As noted, a user (e.g., an SOC analyst) can investigate offenses to determine the root cause of a network issue.

Generalizing, Security Information and Event Management (SIEM) tools provide a range of services for analyzing, managing, monitoring, and reporting on IT security events and vulnerabilities. Such services typically include collection of events regarding monitored accesses and unexpected occurrences across the data network, and analyzing them in a correlative context to determine their contribution to profiled higher-order security events. They may also include analysis of firewall configurations, network topology and connection visualization tools for viewing current and potential network traffic patterns, correlation of asset vulnerabilities with network configuration and traffic to identify active attack paths and high-risk assets, and support of policy compliance monitoring of network traffic, topology and vulnerability exposures. Some SIEM tools have the ability to build up a topology of managed network devices such as routers, firewalls, and switches based on a transformational analysis of device configurations processed through a common network information model. The result is a locational organization which can be used for simulations of security threats, operational analyses of firewall filters, and other applications. The primary device criteria, however, are entirely network- and network-configuration based. While there are a number of ways to launch a discovery capability for managed assets/systems, and while containment in the user interface is semi-automatically managed (that is, an approach through the user interface that allows for semi-automated, human-input-based placements with the topology, and its display and formatting, being data-driven based upon the discovery of both initial configurations and changes/deletions in the underlying network), nothing is provided in terms of placement analytics that produce fully-automated placement analyses and suggestions.

Figure 4:
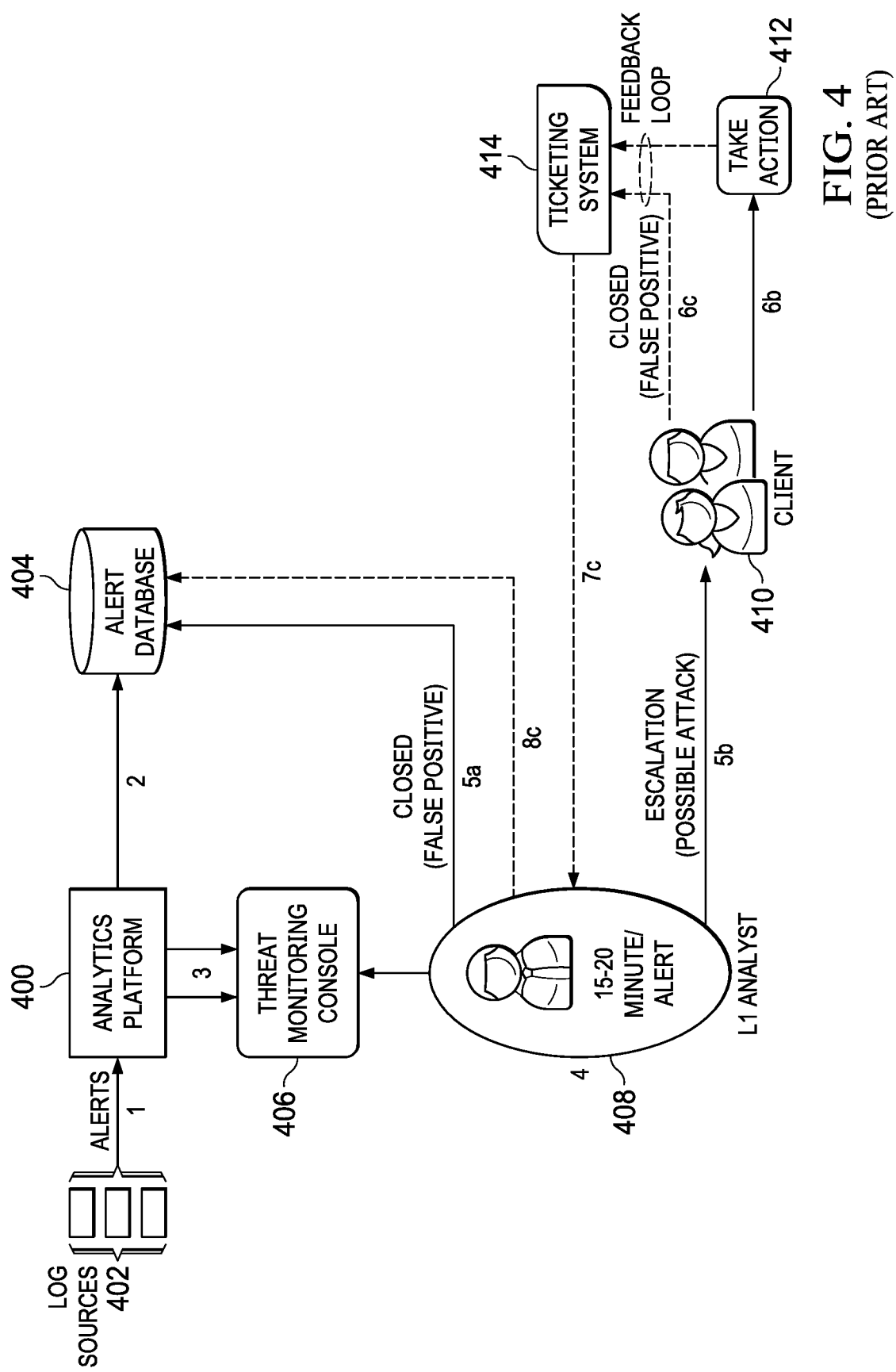
FIG. 4 depicts a Level 1 security threat monitoring operation in a data center operating environment according to known techniques.

FIG. 4 depicts a Security Operation Center (SOC) that provides Level 1 security threat monitoring using an analytics platform 400 such as IBM QRadar. The platform 400 receives alerts (at step (1)) from a variety of log sources 402, such as firewalls, intrusion detection and prevention systems, antivirus systems, web proxies, and other systems and network devices. At step (2), the alerts are stored in an alert database 404. At step (3), the alerts are provided to a threat monitoring console 406 that is manned by a security analyst 408. As is well-known, a SOC typically is manned by different levels of security analysts. A Level 1 (L1) analyst 408 is responsible for monitoring reported security events, and for closing or escalating those events according to SOC rules, policies and procedures. The security analyst 408 typically interacts with a client 410, which is the enterprise entity having an application that is being monitored for security threats. Although not shown, typically the SOC has one or more additional levels of security analysts, such Level 2 (L2) and Level 3 (L3) analysts. Typically, L2 security analysts handle escalations from L1 analysts and perform other administration and management functions, such as monitoring the performance of the L1 analysts to ensure that security events are handled timely, mentoring, and the like. Level 3 analysts handle further escalations (from L2 analysts), and provide additional higher-level administration and management functions in the SOC. Of course, the number of levels and the various tasks associated with each level may be varied and implementation-specific.

As depicted, the L1 analyst makes a finding regarding an alert, typically with a goal of making this finding within about 15-20 minutes after receiving the alert. Typically, the finding closes the alert (step 5(a)) as a false positive, or escalation the alert (step 5(b)) as a possible attack. The false positive finding is stored in the alert database 404. The attack finding typically is reported to the client 410 whose application is affected. Depending on the implementation (e.g., the SOC policy, the client procedure, etc.), some remediation or other action (step 6(b)) is taken; alternatively, the client 410 may indicate that indeed the alert is a false positive and thus should be closed (step 6(c)). The responsive action 412 may be carried out in an automated manner (e.g., programmatically), manually, or by a combination of automation and manual operations. The action may be carried out by SOC personnel, by the client, or by a combination of SOC personnel and the client. As also depicted, information regarding the response to the alert is also provided to a ticketing system 414, and such information may then be reported back to the security analyst (step 7(c)). The security analyst may then update the alert database (at step 8(c)) with the information about how the alert was handled (or otherwise closed). Thus, the alert and its associated handling information is stored in the alert database 404 and available as a data source going forward.

Exercising Security Control Point (SCP) Using Simulated Traffic Flows

With the above as background, the techniques of this disclosure are now described. As noted above, a goal of this approach is to test and validate the behavior of a security control point (SCP) that is actively protecting a target computing system (sometimes referred to as an "endpoint"). This testing is carried out while the SCP is in-place and processing real traffic. As used herein, an SCP should be broadly construe to refer to security device that performs security functions, and thus an SCP typically is a firewall, a gateway, an intrusion detection and prevention device or system (IDS), a malware detector, an antivirus device or system, a web proxy that provides a security function, and other systems and network devices that protect enterprise endpoints. Typically, the SCP is implemented as a combination of hardware and software, but the SCP in the alternative may be implemented as a virtual device (e.g., in a cloud computing environment). In operation, an SCP is enabled with a security configuration that provides for general protection processing according to one or more security mechanisms that are enabled on or in association with the SCP. The particular security mechanisms are known.

Figure 5:
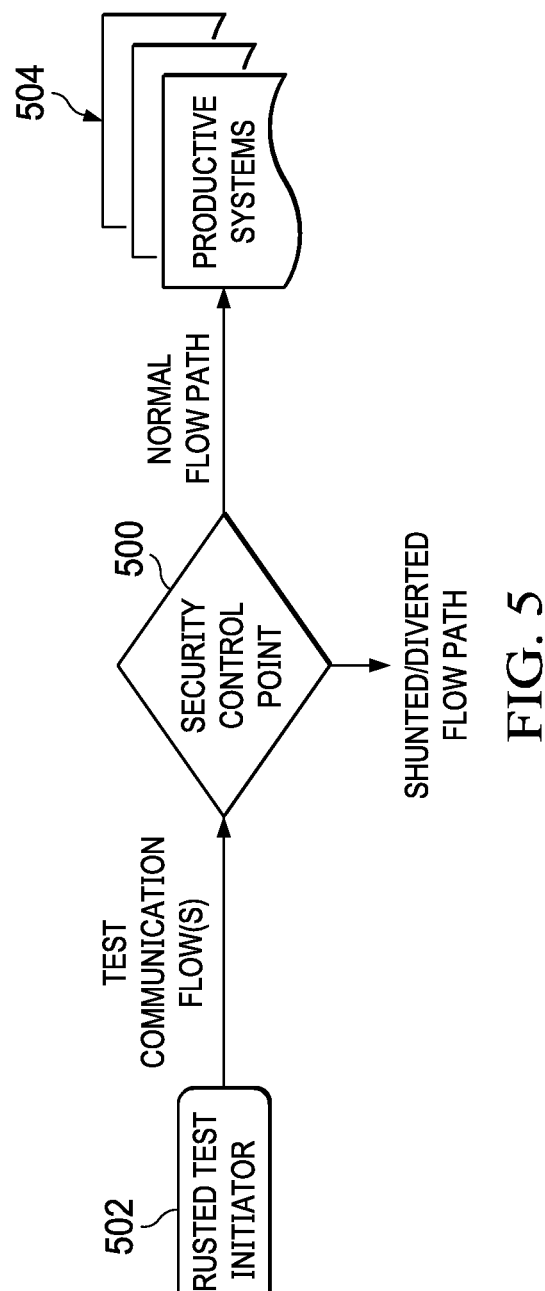
FIG. 5 depicts a first embodiment of the technique of this disclosure wherein a trusted test initiator system is configured as a front-end to a security control point (SCP)-under test.
Figure 6:
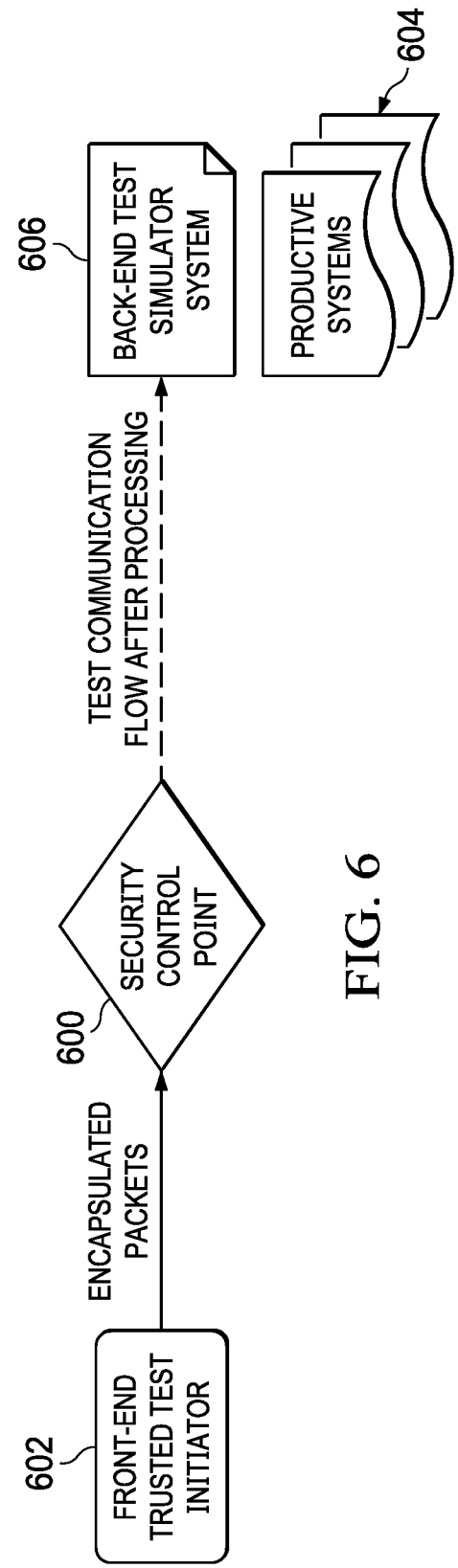
FIG. 6 depicts a second embodiment of the technique wherein both a front-end test initiator system together with a back-end simulator are used to facilitate the in-place testing of the SCP.

In a first embodiment, and as depicted in FIG. 5, a SCP-under-test 500 is exercised by a test initiator system 502 that is configured as a "front-end" to the SCP that is protecting a target endpoint or other production system 504. In a second embodiment, and as depicted in FIG. 6, the SCP-under-test 600 that is protecting target endpoint system 604 is exercised by the front-end test initiator system 602 that also has an associated back-end test simulator system 606 as well. In both embodiments, the test initiator system generates a simulated communication flow that comprises network traffic flows. A simulated communication flow may be generated from test data, from actual historical data (e.g., captured from logs or other packet capture devices and systems), or from a combination of such simulated and historic flow data. The notion is that the simulated communication flow generated or otherwise provided by the test initiator system looks to the SCP to be an actual flow and thus "exercises" the SCP when the SCP receives and processes that simulated flow in its ordinary operation. Once appropriately authorized (i.e., identified and authenticated) into the network and thus "trusted," the test initiator system is configured to transmit one or more simulated communication flows to the SCP being tested. Preferably, the communication flows are also encapsulated and thus are secure from attack or analysis, except by the SCP (or other devices and systems trusted to view them). As will be further described, the SCP preferably includes a service (which may be an add-on, or native) that extracts the encapsulated flow, and then processes that flow through one or more of the SCP's configured protection mechanisms. In this manner, the SCP processes the simulated communication flow as though it were a real session, and thus to determine what actions (as determined by the configured mechanisms), if any, should be taken with respect to that flow.

Thus, and in both embodiments (FIG. 5 and FIG. 6), the test initiator system generates (or otherwise obtains, perhaps from another data source) and provides one or more simulated communication flows to the SCP-under-test, which then processes those flows as if they are real network traffic. In these embodiments, however, preferably these simulated communication flows are not forwarded on to the target endpoint or other production system (504 in FIG. 5, or 604 in FIG. 6). Thus, the "normal flow path" shown in FIG. 5, for example, is not used and/or bypassed, and the output of the SCP is provided over the "shunted/diverted flow path." Typically, the target endpoint or production system is a computing system such as described in FIGS. 1-2 above. Further, the test initiator system and/or associated back-end test simulator may comprise or be otherwise associated with a security intelligence platform such as depicted in FIG. 3, although other implementation approaches may be used. The test initiator system and back-end test simulator typically are implemented as computer software executed in one or more hardware processors, or as virtual machines in a cloud compute environment, or processes, functions or modules in other types of security devices, appliances, systems, products or services.

Figure 7:
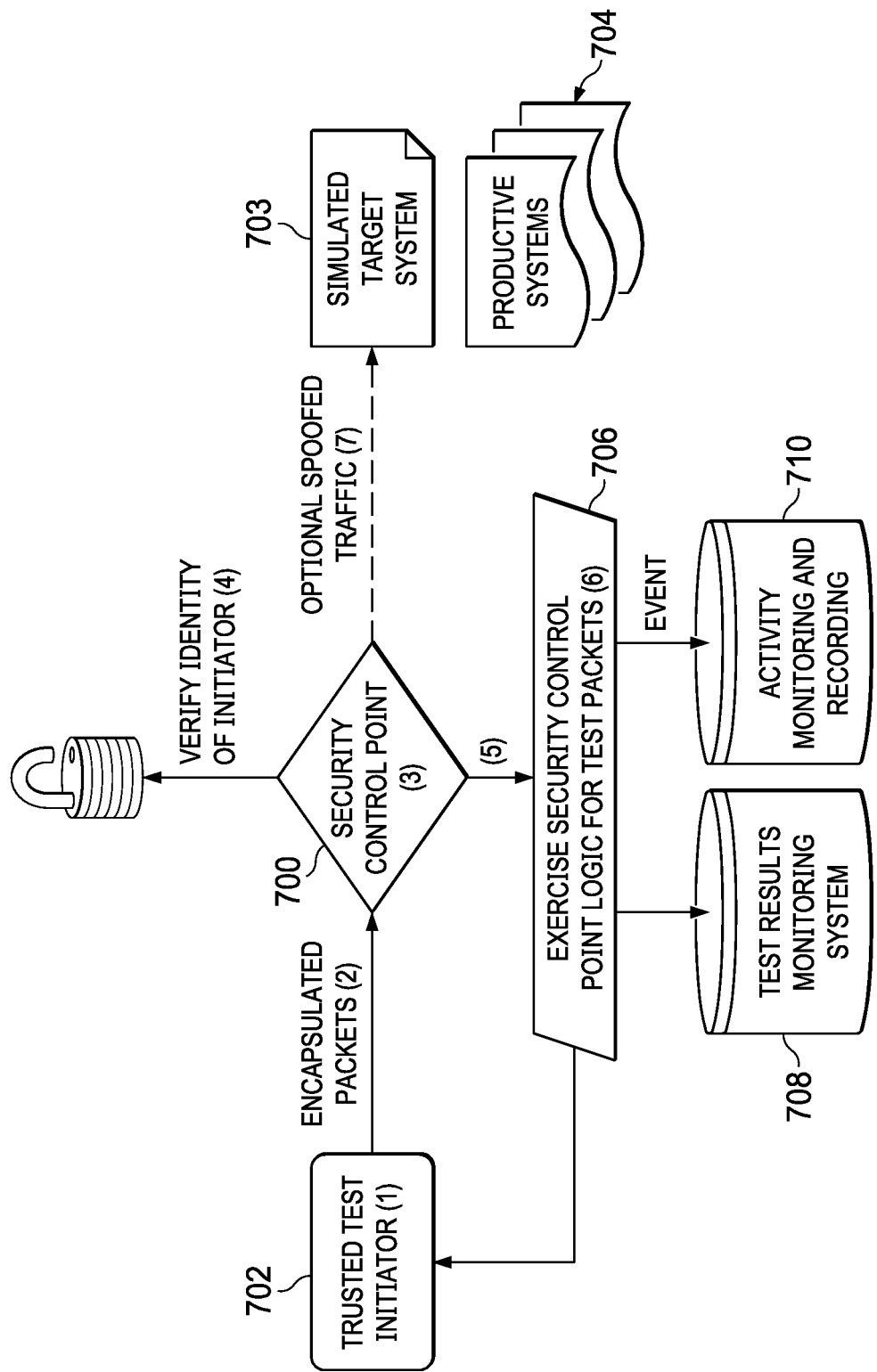
FIG. 7 depicts an operating scenario of the various elements in the second embodiment.

FIG. 7 depicts a typical operating scenario according to this disclosure. As shown, a SCP device 700 is configured in a network and is protecting one or more target computing systems or endpoints 704, all in a known manner. According to this disclosure, a trusted test initiator 702 is provided to generate (step (1)) and provide to the SCP (step (2)) one or more data packets. As described above, the data packets are encapsulated as a simulated communication flow. At step (3), the SCP 700 receives the simulated communication flow and, as necessary, continues at step (4) to verify whether the initiator can be trusted. Typically, step (4) involves the SCP verifying the identity of the test initiator system 702. This trust may be established in advance, on a flow-by-flow basis, or otherwise such that the SCP only processes the simulated communication flow when the test initiator system indeed is a trusted source. The validity of the test initiator system 702 may be authenticated or otherwise verified through a number of different mechanisms, such as an encrypted key that is shared by SCP 700 and the system 702. In more complex deployments, the authenticity of the test initiator source may be validated through a common internet protocol authenticated handshake. The simulated communication flow also may be protected or secured with known techniques, e.g., use of TLS/SSL, encryption, digital signatures, secure tunneling, and so forth.

Preferably, the encapsulated test scenario (as represented by the simulated communication flow) is transmitted to the security control point 700 device through one of two different methods/options, which are now described. In one option, and at step (1), an outer TCP/IP packet header includes the IP address of the security control point 702 as a destination, and the source IP address of the trusted test initiator 702. In the alternative option, the outer TCP/IP packet header has the destination IP address of a potential endpoint 704 that is protected by the security control point and, for a source IP address the flow will have either the source address of the test initiator system, or (as depicted at step (7)) a spoofed IP source address of a simulated target system 703 (if the latter is permitted in the test environment). In addition, in both options preferably there is a flag in the packet header to indicate to the SCP that this is a special test scenario packet. When (the second option) a spoofed source address is utilized, an embedded piece of data in the outer packet includes an IP address of the test initiator, so that results (generated by the SCP) may be transmitted; alternatively, these results are harvested out of band (e.g., such as via a log event).

Referring back to FIG. 7, in a typical case, and at step (4), the packets are de-encapsulated and authenticated by the SCP to ensure that the packets are from an authorized source. This initial check ensures that simple forms of malicious traffic do not enter the test path in the SCP device. Preferably, the communication flow comprises multiple test scenario packets encapsulated within a TCP/IP packet or session, using the option(s) described above.

After verifying the test source (in step (4)), the SCP accesses the encapsulated portion of the payload(s) to facilitate the test logic within the SCP. Stated another way, once the SCP has performed the preliminary identity verification functions, it is now time to process the encapsulated packet/session. To this end, preferably the security control point 700 is augmented to include one or more software module(s) 706 to facilitate processing each packet (step (6)) as if it were a live packet on the network. As noted above, in this respect the SCP is acting to protect a "real" production system 704. To this end, preferably the SCP exercises all (or some configurable subset) of the applicable protections in place, which may include, but are not limited to: access control list filter entries, malicious code detection, signature based algorithms, and so forth. These protections may be exercised or varied on a per simulated flow basis. The result of the testing by the SCP protection for the specific target system is then output for further processing through one or more mechanisms, such as direct response to the trusted test initiator 702 (by sending the result to the test initiator IP address), by forwarding the result to an IP address/hostname of a pre-configured test-results management system 708, and, by issuing an event to an activity monitoring and recording system 710, such as a logging system.

Thus, according to the technique herein, one or more communication flows that are flagged (or otherwise tagged) as being test communication flows are received at a security control point and then processed through the SCP's test logic, and the results output from the SCP are then shunted away from the target production system and instead delivered to a logging mechanism, or a test simulator, etc., for correlation, reporting and further analysis. The specific result conditions from the test of the SCP's protection/processing logic will vary depending on the capability of the particular SCP. Typical flow test result conditions are: permit, deny, block, alert, sandbox, fail, success, and so forth. Result conditions may also have a group of characteristics, such as "permit and block" or "deny, alert and sandbox." Security management systems, correlation/analytics processes and even subject matter experts (or expert systems) can then compare configurations, expected behavior, etc. with live, observed behavior to validate environments, identify potential issues, and iteratively improve security posture and implementations.

Preferably, the result that is output/logged is provided in a language used in the specific SCP, and it will indicate that the particular traffic processing result is associated with a simulation test (so as not to confuse security monitoring and analysis into treating the flow as real traffic to a real endpoint).

As a variant, for more complex session-oriented traffic flows, it may be desirable to off-load the SCP processing in whole or in part to a test-target endpoint, such as the simulated target system 703 shown. This approach may also be used when it is not feasible to have a general-purpose security control point handle such session traffic. Thus, in an alternative approach, a negotiation between the test initiator 702 and the security control point 700 may include the definition of a test-target endpoint (such as simulated target system 703), where session traffic is to be diverted after the security control point performs the necessary processing. This variant scenario assumes traffic is then passed as per security control point protection configurations for the real (production) system. The test-target endpoint is customized as necessary to perform the testing, namely, the session initiation, data transfer and protection analysis, etc., based on the simulated traffic provided by the test initiator through the SCP-under-test.

Thus, and as depicted in FIG. 7, the SCP 702 that is protecting a target computing system is tested in-place and while active. Thus, the SCP—either directly or indirectly as has been described—processes the simulated communication flow as though it were a real session, and thus to determine what actions, if any, should be taken. According to this approach, however, preferably the SCP does not deliver the simulated session traffic to the target computing (i.e., the actual production) system(s). Stated another way, the SCP shunts or otherwise diverts the simulated flow (e.g., by destroying the packets, delivering them to a dummy location, etc.) so that the flow does not reach the target production system(s). The results of the simulated processing by the SCP, however, are output to other systems (e.g., logging or alerting mechanisms), or they are returned to the test initiation system, e.g., for correlation, reporting, and the like. Using this approach, Information Technology (IT)

security management organizations remotely, automatically and programmatically determine the behavior and therefore protection levels of a SCP and with respect to any potential, specific, source and destination systems.

As noted above with respect to FIG. 6, and in addition to the test initiator system (operating as a front-end to the SCP), in an alternative embodiment a back-end testing simulation server is configured behind the SCP, preferably in a same logical compartment as the actual target system. Thus, in the context of FIG. 7, the element 703 corresponds to the back-end testing simulation server. In addition to performing general protection processing per the enabled configurations as described above, the SCP 700 passes the communication flow on to the back-end simulator system 703 (once again, instead of to the actual target system). In this manner, the front-end and back-end testing systems 702 and 703 interact with one another via one or more conversations (flows) that are conducted between them, all while having the SCP 700 process those flows through its enabled protection mechanisms as if it were for the actual source and destination systems. In effect, the front-end and back-end testing systems act as surrogates for the actual source and destination systems. In this scenario, the SCP is a party to the simulation (i.e., is an "aware" middleman). In particular, the initiator and the back-end simulator are simulating a real conversation between real endpoint IP addresses through traffic that is tunneled through the SCP. The approach of using a back-end simulator in this manner is that more detailed and complicated communication "conversations" (flows) are enabled to be conducted between the front-end test simulator initiator and the back-end test destination simulator (as compared with just within the SCP), all while the SCP processes traffic as normal by facilitating the tunneled communication and processing of the encapsulated flows through its defined SCP configuration as if it were real source and destinations.

The testing approach here provides significant advantages. It enables validation of the behavior of any type of security control point in a network, seamlessly and in a manner that does not impair the SCP's operation. The approach does not require review of security point configuration; indeed, the SCP is expected to exercise all of the applicable protections in place. Further, because the simulated flows can be customized as desired or needed, the SCP testing is far more granular than the generic testing approaches in the prior art. Moreover, the approach here works well and scales efficiently regardless of whether the endpoints operate in a standalone manner or are part of larger network level approaches. The technique of leveraging the SCP's standard processing flow ensures that there is no additional burden on the target system. Both the SCP's and the production system's ability to provide their intended services are unaffected, and the approach ensures that all source/destination variations and their associated communication flows can be reliably and accurately tested. The technique provides significant visibility and intelligence regarding security control point protections for specific target systems, thus ensuring optimal service and the discovery of avoidable threats.

While the approach herein has been described primarily in the SCP context, this is not a limitation, as the live testing approach herein may be utilized or implemented in any contexts, e.g., in a cloud computing environment wherein virtual machines or software defined functions provide the security function-under-test.

More generally, computing devices within the context of the disclosed subject matter are each a data processing system comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The techniques described herein may be implemented in or in conjunction with various data center architectures including simple n-tier architectures, web portals, federated systems, and the like. As also described, the live testing technique described herein also may be practiced in a loosely-coupled server (including a "cloud"-based) environment, whether, private, public, or hybrid.

Still more generally, the subject matter described herein can take the form of an entirely hardware embodiment, an entirely software embodiment or an embodiment containing both hardware and software elements. In a preferred embodiment, the trusted platform module function is implemented in software, which includes but is not limited to firmware, resident software, microcode, and the like. Furthermore, the download and delete interfaces and functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible, non-transitory item.

The computer program product may be a product having program instructions (or program code) to implement one or more of the described functions. Those instructions or code may be stored in a non-transitory computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the trusted test initiator is implemented in a special purpose computing platform, preferably in software executed by one or more processors. The software is maintained in one or more data stores or memories associated with the one or more processors, and the software may be implemented as one or more computer programs. Collectively, this special-purpose hardware and software comprises the functionality described above.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

The techniques herein generally provide for the above-described improvements to a technology or technical field, as well as the specific technological improvements to security control point technologies (or to security platforms that include such devices or functions), such as described above.

Having described our invention, what we claim is as follows:

1. A method of testing in a live production environment comprising:
   generating a test communication flow at a front-end test initiator system, the front-end initiator system having an associated back-end test simulator system, and wherein the front-end test initiator system and the back-end test simulator system comprise a source and a destination for the test communication flow;
   configuring a security control point that is active in the live production environment to receive the test communication flow, the security control point having a configured set of one or more protection mechanisms that are applied to data packets passed to the security control point;
   verifying that a source of the test communication flow is trusted;
   upon a determination that the source of the test communication flow is trusted, applying the configured set of one or more protection mechanisms to the test communication flow;
   outputting a result of applying the configured set of one or more protection mechanisms to the test communication flow for further analysis; and
   delivering the result to the back-end test simulator system.

2. The method as described in claim 1 further including diverting the test communication flow away from a target system in the live production environment.

3. The method as described in claim 1 wherein the further analysis includes one of: returning a response to the test initiator system, forwarding data to a test results management system, and issuing an event to an activity monitoring and recording system.

4. The method as described in claim 1 wherein the configured set of one or more protection mechanisms includes one of: an access control list filter, a malicious code detector, and a signature-based algorithm.

5. The method as described in claim 1 wherein a distinct protection mechanism is applied with respect to the test communication flow.

6. Apparatus for testing in a live production environment, the live production having a security control point that is active in the live protection environment, the security control point having a configured set of one or more protection mechanisms that are applied to data packets passed to the security control point; comprising:
   one or more hardware processors;
   computer memory holding computer program instructions executed by the hardware processors and configured to:
     generate a test communication flow at a front-end test initiator system, the front-end initiator system having an associated back-end test simulator system, and wherein the front-end test initiator system and the back-end test simulator system comprise a source and a destination for the test communication flow;
     receive the test communication flow;
     verify that a source of the test communication flow is trusted;
     upon a determination that the source of the test communication flow is trusted, apply the configured set of one or more protection mechanisms to the test communication flow;
     output a result of applying the configured set of one or more protection mechanisms to the test communication flow for further analysis; and
     deliver the result to the back-end test simulator system.

7. The apparatus as described in claim 6 wherein the computer program instructions are further configured to divert the test communication flow away from a target system in the live production environment.

8. The apparatus as described in claim 6 wherein the further analysis includes one of: returning a response to the test initiator system, forwarding data to a test results management system, and issuing an event to an activity monitoring and recording system.

9. The apparatus as described in claim 6 wherein the configured set of one or more protection mechanisms includes one of: an access control list filter, a malicious code detector, and a signature-based algorithm.

10. The apparatus as described in claim 6 wherein a distinct protection mechanism is applied with respect to the test communication flow.

11. A computer program product in a non-transitory computer readable medium for use in a data processing system for testing in a live production environment, the live production having a security control point that is active in the live protection environment, the security control point having a configured set of one or more protection mechanisms that are applied to data packets passed to the security control point, the computer program product holding computer program instructions executed in the data processing system and configured to:
   generate a test communication flow at a front-end test initiator system, the front-end initiator system having an associated back-end test simulator system, and wherein the front-end test initiator system and the back-end test simulator system comprise a source and a destination for the test communication flow;
   receive the test communication flow;
   verify that a source of the test communication flow is trusted;
   upon a determination that the source of the test communication flow is trusted, apply the configured set of one or more protection mechanisms to the test communication flow;
   output a result of applying the configured set of one or more protection mechanisms to the test communication flow for further analysis; and
   deliver the result to the back-end test simulator system.

12. The computer program product as described in claim 11 wherein the computer program instructions are further configured to divert the test communication flow away from a target system in the live production environment.

13. The computer program product as described in claim 11 wherein the further analysis includes one of: returning a response to the test initiator system, forwarding data to a test results management system, and issuing an event to an activity monitoring and recording system.

14. The computer program product as described in claim 11 wherein the configured set of one or more protection mechanisms includes one of: an access control list filter, a malicious code detector, and a signature-based algorithm.

15. The computer program product as described in claim 11 wherein a distinct protection mechanism is applied with respect to the test communication flow.

\* \* \* \* \*